United States Patent

[11] 3,624,806

| [72] | Inventor | Per Haakon Lytzen<br>Klampenborg, Denmark |
|---|---|---|
| [21] | Appl. No. | 15,388 |
| [22] | Filed | Mar. 2, 1970 |
| [45] | Patented | Nov. 30, 1971 |
| [73] | Assignee | Aktieselskabet Brodrene Hartmann<br>Lyngby, Denmark |
| [32] | Priority | Mar. 4, 1969 |
| [33] | | Denmark |
| [31] | | 1202/69 |

[54] METHOD OF HEAT TREATING BY CONVECTION OBJECTS, SUCH AS FLAT INDIVIDUAL BLANKS, MOLDED PULP ARTICLES OR CONTINUOUS WEBS OR THREADS, FOR EXAMPLE FOR PLASTIC FIBERS, AND A KILN FOR USE IN THE METHOD
15 Claims, 6 Drawing Figs.

| [52] | U.S. Cl. | 263/3, 34/155 |
|---|---|---|
| [51] | Int. Cl. | F27b 9/28 |
| [50] | Field of Search | 263/3; 34/155, 156, 160 |

[56] References Cited
UNITED STATES PATENTS

| 92,210 | 7/1869 | Richardson | 34/155 |
|---|---|---|---|
| 2,012,115 | 8/1935 | Woodruff | 34/156 x |
| 2,144,919 | 1/1939 | Gautreau | 34/156 X |
| 2,775,046 | 12/1956 | Kabelitz | 34/156 X |
| 3,254,426 | 6/1966 | Lamb et al. | 34/155 |
| 3,521,375 | 7/1970 | Sanders, Jr. | 263/3 |

Primary Examiner—John J. Camby
Attorney—Beveridge & De Grandi

ABSTRACT: Painted blanks as well as extruded or molded objects are exposed to heat-conditioned air by passing through a kiln in which the air is recirculated. The heat convection is intensified and better distributed over the entire width of the kiln by producing transverse layers of a high pressure in the air just before it meets the material. For instance the compression layers may be produced in a continuous series by passing the air through a transverse-flow blower or a series of concentric radial blower wheels with a distance between them to secure air inlet.

INVENTOR.
PER HAAKON LYTZEN
BY
Beveridge + DeGrandi,
Attorneys

INVENTOR.
PER HAAKON LYTZEN

METHOD OF HEAT TREATING BY CONVECTION OBJECTS, SUCH AS FLAT INDIVIDUAL BLANKS, MOLDED PULP ARTICLES OR CONTINUOUS WEBS OR THREADS, FOR EXAMPLE FOR PLASTIC FIBERS, AND A KILN FOR USE IN THE METHOD

In the heat treatment of flat individual blanks, molded pulp objects or continuous webs or threads, for example for plastic fibers, by convection, it is known to blow heat-conditioned air circulating in a closed circuit against the material to be treated, subsequently causing the air to sweep the material on all sides or to flow substantially along the material while this is passing through the kiln.

The object of the invention is to increase the heat convection and thereby to intensify the treatment.

In the treatment of plastic webs it is known that in stretching monofilaments and foils of plastic a very quick heating at the lowest possible overtemperature in the kiln is desirable, since the material must not after stretching be subjected to continued heating at an excessive temperature by which the material would be damaged and its tensile strength reduced.

The reason hereof is that during the stretching of the material the molecules are oriented in the longitudinal direction, and the tensile strength of the material is increased 10 to 30 times. At continued heating to an overtemperature after the stretching the molecules again lose their orientation and the tensile strength of the material is diminished.

It is also commonly known that in surface drying of blanks by convection prior to lacquering it is desirable to dry the surface of its moisture and to perform this operation quickly so that complete drying or heating of the material throughout is avoided, and after lacquering of the material it is desirable to be able to dry and harden the lacquer film at the lowest possible overtemperature. Quick heating is therefore effected so that the lacquer film very quickly attains the desired hardening temperature without the material beneath the lacquer film having time to be heated by convection from the said film, which would delay its hardening or cause damage to the material. For example, glued joints beneath a plywood sheet must not be heated to the temperature at which the glue loses its strength, and, further, most sheets of wood fiber and, in particular, shaving sheets, will curve if heated. The said problems in drying lacquered objects are also present in the case of other forms of surface treatment, in particular in puttying or filling.

It is further commonly known that in convection kilns for quick treatment of blanks passed through the kilns at relatively high speed it is difficult to distribute the circulating air—and consequently the heat transmitted—uniformly over the entire kiln width without using guide vanes which are difficult to place and adjust.

At the quick treatment of material by means of convection it is also necessary to work with suitable overtemperatures, in which connection it is known that the material to be heat-treated attains an undersired overtemperature if the advancement of the material through the kiln is suspended at an improper moment.

Conversely, when the conveyance of the material has been stopped and the kiln temperature has been lowered, the kiln has again to be brought up on the desired operating temperature timed to the restarting of the conveyance of the material.

The object of the present invention is to provide an increase in the heat transmission from the circulating air in a convection kiln to the material at the lowest possible overtemperature in the kiln, and to make it possible to distribute the said heat transmission uniformly over the entire kiln width and to reduce or increase the heat transmission to the material timed to stopping or restarting of its transport through the kiln.

The object of the present invention is more particularly to make an increased heat transmission from the circulating hot air to the material to be treated possible.

For this purpose transverse, compressed layers are in the method according to the invention produced in the air directly before it meets the material to be treated so as to produce a shock effect by pulsations of suitable frequency directed against the material, thereby increasing the capacity to remove the insulating air portions adhering to this in advance. The circulating air will thereby fan over or flow in pulsations on all sides of the material and remove the said air portions quickly and more effectively from the said material, which is then exposed to the action of the hot circulating air and heated very quickly and effectively by this air. Of course, a pressure equalization in the hot air current itself will soon take place, not least because the airflow around the material by no means is, or has to be, linear, but since the treatment is of very brief duration, the compression layers of the hot air will be maintained for a sufficient time to produce the said increased heating by convection when the air meets the material to be treated.

In order to utilize the said effect best possible the material to be treated may according to the invention be passed through the kiln directly past a transverse-flow blower in close proximity to same.

The transverse-flow blower, which causes the air to circulate in the kiln, is provided with a suitable number of vanes and operates with a suitable peripheral speed, by which the circulating air from the blower strikes the material to be treated directly at a great velocity as repeated brief pulsations, removing with cutter or miller like effect the pulsating, stationary cold layer of air attaching to the material to be treated, substituting it through pulsations by hot kiln air.

It is known that in the transmission of heat from hot air to a solid material, the greatest resistance to the heat transmission is at the surface of the solid material (the heat transfer coefficient), the said resistance being dependent upon the movement of the air, so that at a uniform flow of the air (laminary) the heat transmission is less than in the case of a turbulent flow.

In a turbulent flow the heat transmission is increased thereby that the stationary layer of air at the surface of the material treated is agitated, and the method according to the invention as just described must be compared with the fact that a more or less casual turbulence is substituted by powerful, pulsating shocks, which may be given a desired frequency, dependent upon the number of vanes and the speed of the transverse-flow blower.

The invention is also concerned with a kiln for carrying the said method into effect. The said compressed layers of air may be produced by means of a kiln, the essential feature of which is that the transverse-flow blower is mounted at one end of the air bypass channel, the width of the transverse-flow blower corresponding substantially to the width of the kiln section through which the material to be treated is passing. Transverse-flow blowers are both simple and very suitable for producing compression layers of the desired kind, and, in addition, the transverse-flow blower may also be utilized for keeping the circulating air in motion.

It has been found that optimum convection is obtained when the relative meeting between the kiln air and the material treated takes place at a steep angle, and according to the invention the transverse-flow blower is so positioned that the air is hurled against the material at an acute angle with same or against its direction of movement.

The air is thus blown over the material, and the shock effect of the air will be diminishing with increasing distance from the fan, but this is of less importance since the treatment is of brief duration.

The kiln is of such design that after having passed over the material again the kiln air is returned to the transverse-flow blower by suction through a return passage, by which the said blower is utilized to produce a recirculation of the kiln air.

The transverse-flow blower is made of a length corresponding to the width of the kiln, by which the heat transmitted from the kiln to the material to be treated is distributed exactly uniformly by the said blower throughout the entire width of the kiln without the use of guide vanes.

If it is desired to treat the material from two sides or it consists of two foil webs, the kiln may according to the invention be provided with one bypass channel above and another bypass channel below and use two transverse-flow blowers, and the treatment may further be repeated by the provision of several transverse-flow blowers in the longitudinal direction of the kiln.

By such an arrangement the material will directly upon entering the kiln section be subjected to a uniform heating action from both sides.

In the case of interrupted operation it is essential, as mentioned in the foregoing, that the heat treatment can be interrupted very quickly so that injurious excessive heating of the material cannot take place. The bypass channel of the kiln has therefore according to the invention a damper directly in front of the transverse-flow blower to permit opening to the atmosphere of the air circulation between the heat conditioning body of the later and the transverse-flow blower so that in case of discontinuous operation or operational trouble the temperature of the air inside the kiln may be lowered immediately.

In the bypass channel—at the opposite end of the transverse-flow blower, i.e. where the material is discharged from the kiln—there may further according to the invention be provided an overpressure damper through which the air introduced through the damper previously referred to may escape without recirculating, by which the air velocity through the heating body is reduced while the material is stationary so that heat is accumulated in the heating body for use when restarting.

According to the invention all the dampers may be controlled by a thermoregulating system with thermal sensors provided in the bypass channel, partly after the heating body, partly in front of the transverse-flow blower.

The drawing shows a couple of plants designed in accordance with the invention.

Figure 1:
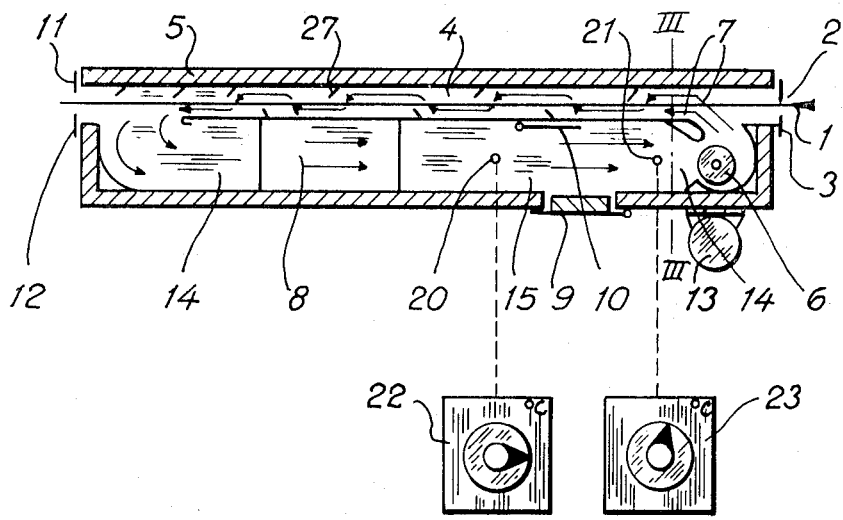
FIG. 1 shows a vertical longitudinal section through a plant in operation.
Figure 3:
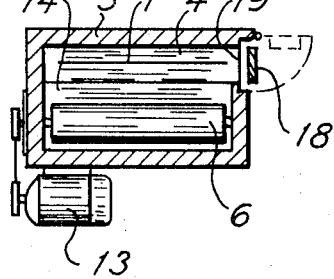
Figure 4:
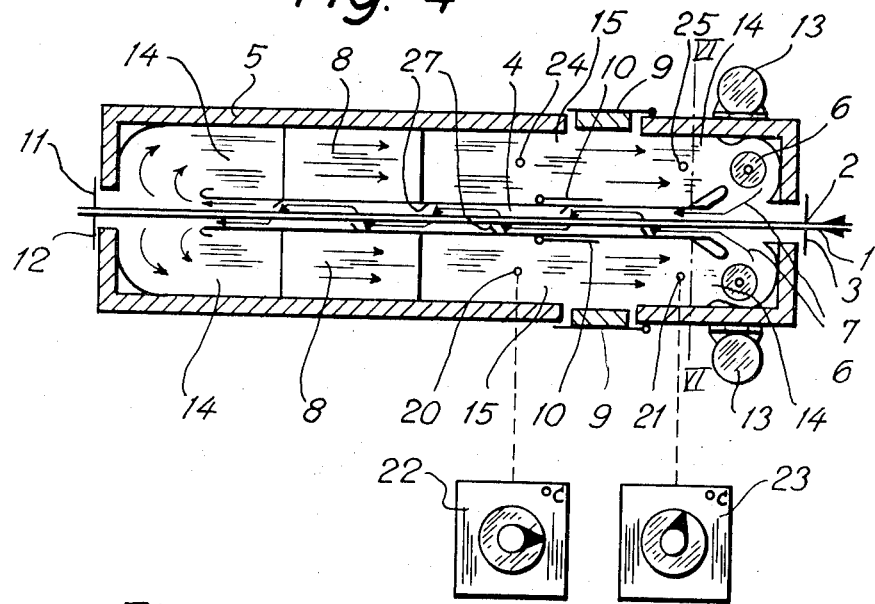
Figure 5:
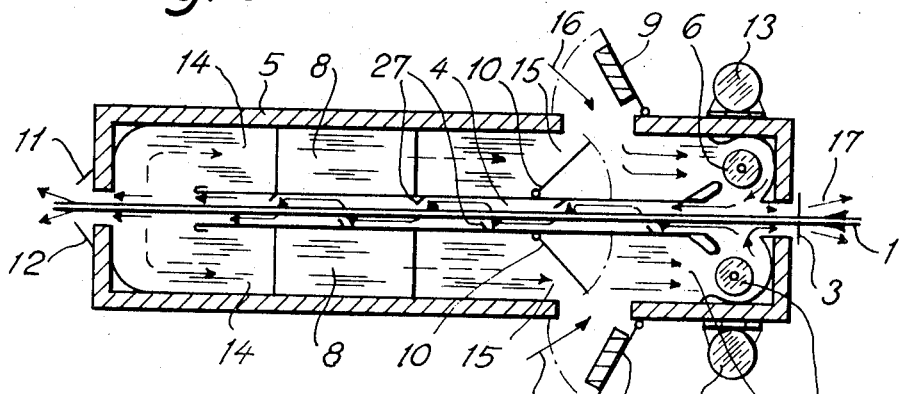
Figure 6:
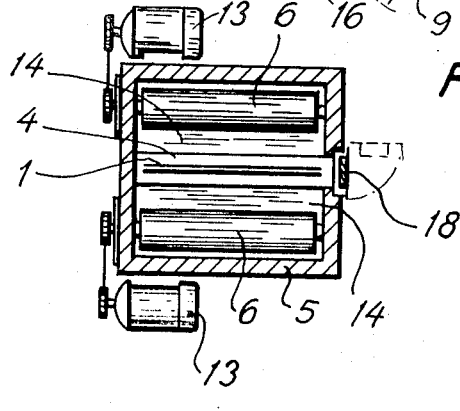

FIG. 3 a vertical section taken on the line III—III of FIG. 1 showing same in operation, FIG. 4 a vertical longitudinal section through a plant with two hot air circulation channels, while in operation, FIG. 5 is a corresponding section showing same while out of service, and FIG. 6 is a section taken on the line VI—VI of FIG. 4, showing same while in operation.

Figure 2:
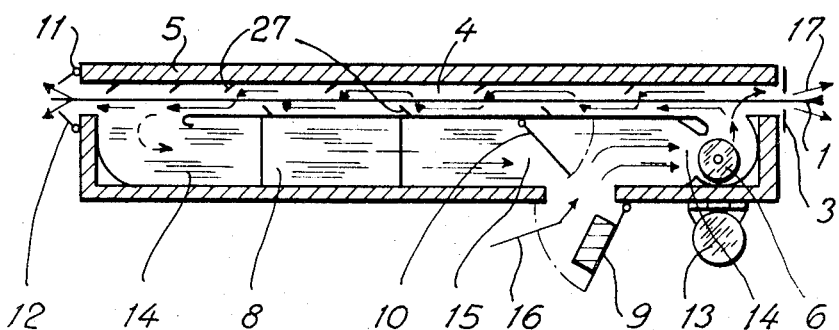
FIG. 2 is a corresponding section showing same while out of service.

In the plant shown in FIGS. 1–3 a web 1 of material is passing through an opening 2 with two removable or movable plates 3 provided in a chamber 4 of the kiln 5. The web 1 of material leaves the chamber 4, passing a damper 12 consisting of two flaps 11.

In the chamber 4 the web of material is stretched about 10 times, by which the molecules of the material are oriented in the longitudinal direction as mentioned, which means that the tensile strength of the material is increased by about 10–30 times. The total length of the kiln is 2.5 m., and the stretching itself, that is, the linear orientation of the molecules, is effected within the first meters inside the kiln, which corresponds to about 0.5 sec.°. Along the last 1.5 m. in the chamber 4 the material is stabilized in such manner that the molecules do not lose their orientation, by which the material would lose the great tensile strength obtained. SInce the rate of advancement of the material after the point of stretching has been increased about 10 times, the time for the passage of the material through the last 1.5 m. of the kiln will correspond to about 0.3 sec. This means that the material will remain in the kiln for 0.8 sec. in all. For example it may be mentioned that at a desired temperature of the material of about 120° C. this will imply an air temperature of about 180°–200° C. in the kiln.

The air is advanced by a transverse-flow blower 6 which forces the air up into the chamber 4 in the direction indicated by arrows 7, and since the blower introduces transverse compressing layers in the air, air pulsations will clear the web of the cold air portions surrounding it and attaching to it so that the hot air momentarily gets into contact with the web and heats it to the temperature of the air. Through the chamber 4 the air flows concurrently with the web 1, but to ensure that the air sweeps the web on all sides a number of baffles 27 have been inserted in the chamber, and these will break any tendency of the air to flow laminarily.

DIrectly before reaching the damper 12 the air is passed down into a bypass channel 14 in which it is reheated by a heating body 8, hence to be sucked to the blower 6 to make a recirculation.

When the plant is stopped, a damper 9 is immediately opened, just as also the damper 11 is opened as indicated in FIG. 2, and at the same time a flap 10 swings into that part 15 of the recirculation channel 14 which is located between the heating body 8 and the blower 6.

As a result, the air circulation circuit is opened to the atmosphere, and cold air immediately enters as indicated by an arrow 16, the hot air in the channel simultaneously leaving same through the damper 12 and to some extent also through the opening 2 as indicated by arrows 17.

The sudden interruption of the supply of hot air to the chamber 4 means that such parts of the web 1 as stop in the said chamber avoid excessive heating and consequent destruction, and, simultaneously, the hot air flowing through the channel 14 and the heating body 8 is substantially reduced in quantity and velocity, by which the heating body may accumulate heat which is utilized on restarting the plant.

Access is provided for introducing webs or threads in the kiln through an opening covered by a trap 18 and extending throughout the entire kiln length (FIG. 3), and behind which there is a heat-resistant curtain 19, for example of asbestos. When the web is started, the trap 18 and the dampers 9 and 12 are closed, and since the flap 10 is simultaneously swung back into the position indicated in FIG. 1, the inflowing amounts of cold air will directly afterwards be succeeded by fully heated air from the channel section 15, so that hot air of treatment temperature is at once passed to the web 1. This means that the blower 6 has not to be stopped for brief periods of standstill in operation.

In the case of discontinuous operation of the web 1 no changes or variations in the operation of the blower will be involved either, which is important, because changes in its operation cannot be performed momentarily.

Considering that only fractions of a second are available when the dampers are opened or closed, it will usually be desired to perform these operations mechanically and automatically. For this purpose the kiln is provided with two temperature regulators 22 and 23 which adjust and ensure proper temperatures in the kiln, both during its operation and standstill, by acting upon the supply of heat to the heating body 8.

Each regulator 22 and 23 has a sensor, 20 ans 21, respectively, in the channel section 15, arranged before and after the damper 9, respectively. Only the regulator 22 set at the highest temperature is connected during operation, and when an impulse from the mechanism driving the web (the said mechanism is not shown in the drawing) or from another manual switch (not shown either) is transmitted to the temperature regulator 23 as the web stops, the said regulator 23, which is adjusted to a lower temperature, will be connected. The regulator 23 will control the dampers 9 and 10, by which the adjusted lower temperature for cooling the web may be maintained very exactly until an opposite impulse is transmitted, causing the kiln again to work solely at the higher temperature indicated by the first mentioned regulator 22. This means in practice that the proper, desired kiln temperature is quickly obtained as soon as the cooling is interrupted.

The position of the flap 10 can be regulated automatically by means of the regulator 23 which ensures by means of its sensor 21 that the air supplied to the blower 6 during an out-of-service period has a temperature of, say, 100° C., the airflow entering at the arrow 16 being to a suitable extent mixed with a slow inflow of hot air from the heating body 8. Since the temperature regulators cannot reset the air temperature as quickly as the web is stopped or set into motion—that is, in fractions of a second—the dampers are readjusted momentarily through the pilot current circuit which controls the advancement of the web. At the quick readjustment the dampers strike against basic positions set in advance and then after-regulated by the regulator 23.

The blower 5 is driven at a constant speed by an outer electromotor 13.

The plant shown in FIGS. 4–6 has two bypass channels 14, one on either side of the chambers 4, and each provided with the same elements as the channel 14, which is described in the foregoing. The dampers of the two channels are operating synchronously, and the regulators 22 and 23 have sensors 20, 21, 24 and 25 in both channels.

The blower 6 may be substituted by a series of radial blower wheels fixed on a mutual shaft and having axial distances between them for inlet of air.

In the kiln many other materials may be heat-treated, for example, if they are to be dried or joined by gluing. Single objects may be passed through the kiln lying on a conveyor, for example a driven roller conveyor or a band conveyor.

If, for example, drying of an acid-hardening lacquer film of, say, 80–100 g./m.² on plywood or on wood-fibrous material is involved, the lacquer may—for example after predrying of the solvents at lower temperatures—be hardened in the kiln described at a kiln temperature of 140°–160° and a lacquer temperature of 110°–120° so quickly 10–70 secs., without the underlying wood-fibrous material being heated above a temperature of about 50°–60° in a depth of about 1 mm.

When drying puttied or filled surfaces of wood, steel, metal or asbestos cement objects the time for treating the said materials in the kiln described may be reduced very substantially, as far as down to 5–30 sec.

The drying and hardening period is further reduced if the built-in electric heating surfaces provided in the kiln are provided as infrared sources of radiation which subject the material passed through the kiln to direct radiation, by which the heat transmission will be the sum of the aforesaid heat transmission plus radiation heat.

Conversely, after the hardening the lacquer film may be cooled very quickly by the same method by means of a transverse-flow blower.

I claim:

1. The precess of heat-treating objects with air by convection in a kiln, said process consisting essentially of conveying through the kiln the object, wherein the object has a substantially stationary layer of air, and contacting the object with a heat-conditioned pulsating stream of air having a frequency of pulsation sufficient to substantially remove the stationary layer of air on the object.

2. The process of claim 1 in which the stream of air flows in a closed circuit in the kiln.

3. The process of claim 2 in which flow of the stream of air is cocurrent to movement of the object in the kiln.

4. Process of claim 3 consisting essentially of contacting the object with a substantially laminar transverse flow of air after the pulsating stream of air.

5. Process of claim 1 in which the pulsating stream of air is directed at an acute angle relative to a surface of the object.

6. A device for heat-treating an object with air by convection, said device consisting essentially of a kiln, means for conveying the object through the kiln, means for heat-conditioning the air, means for circulating the air through the kiln, means for directing the flow of the air onto the object and means for pulsating the stream of air at a frequency of pulsation sufficient to substantially remove a stationary layer of air on the object.

7. Device of claim 6 in which the air circulates in a closed circuit.

8. Device of claim 6 in which the kiln consists essentially of a channel in which the pulsating stream of air contacts the object, and at least one air bypass channel for recirculating air from one end of said kiln to an opposite end of said kiln.

9. Device of claim 7 having a transverse-flow blower in one end of said air bypass channel, said blower having a width or height corresponding substantially to a width of the channel in which the pulsating stream of air contacts the object so as to provide a substantially uniform distribution of air through the kiln.

10. Device of claim 9 in which the transverse-flow blower is positioned to direct a flow of air directly onto the object.

11. Device of claim 10 in which the air is directed at an acute angle relative to a surface of the material.

12. A device of claim 7 having an air bypass channel above and below the channel in which the pulsating stream of air contacts the object and at least one transverse-flow blower in each bypass channel.

13. Device of claim 11 in which means for heat-conditioning the air are located in each air bypass channel, and there is provided between said heat-conditioning means and said blower a damper for directing air in said bypass channel to space outside said device.

14. Device of claim 13 having at least one air bypass channel at an end opposite to that of the blower, and an excess pressure damper through which air in the bypass channel can be directed to space outside the deice in order to reduce velocity of flow of air in the device.

15. Device of claim 14 having a thermoregulating system for controlling all dampers, said system including at least one thermal sensor between the heating means and blower in the bypass channel.

* * * * *